United States Patent
Chatterji et al.

[11] Patent Number: 6,138,759
[45] Date of Patent: Oct. 31, 2000

[54] SETTABLE SPOTTING FLUID COMPOSITIONS AND METHODS

[75] Inventors: Jiten Chatterji; James E. Griffith, both of Duncan; Ricky A. Cox, Comanche; Bryan K. Waugh, Duncan, all of Okla.

[73] Assignee: Halliburton Energy Services, Inc., Duncan, Okla.

[21] Appl. No.: 09/465,483

[22] Filed: Dec. 16, 1999

[51] Int. Cl.$^7$ .................................................. E21B 33/13
[52] U.S. Cl. ........................ 166/293; 166/291; 507/928
[58] Field of Search .................................. 166/291, 292, 166/293; 507/928, 269

[56] References Cited

U.S. PATENT DOCUMENTS

| | | | |
|---|---|---|---|
| Re. 31,190 | 3/1983 | Detroit et al. | 166/293 |
| 2,815,294 | 12/1957 | Havelin et al. | 106/118 |
| 4,210,457 | 7/1980 | Dodson et al. | 106/97 |
| 4,555,269 | 11/1985 | Rao et al. | 106/90 |
| 4,671,357 | 6/1987 | Binder, Jr. | 166/291 |
| 4,676,317 | 6/1987 | Fry et al. | 166/293 |
| 4,772,330 | 9/1988 | Kobayashi et al. | 106/400 |
| 4,997,484 | 3/1991 | Gravitt et al. | 106/708 |
| 5,018,906 | 5/1991 | Bonier-Sahuc | 405/263 |
| 5,028,271 | 7/1991 | Huddleston et al. | 106/720 |
| 5,295,543 | 3/1994 | Terry et al. | 166/293 |
| 5,327,968 | 7/1994 | Onan et al. | 166/293 |
| 5,337,824 | 8/1994 | Cowan | 166/293 |
| 5,355,955 | 10/1994 | Rodrigues et al. | 166/293 |
| 5,383,521 | 1/1995 | Onan et al. | 166/293 |
| 5,458,195 | 10/1995 | Totten et al. | 166/293 |
| 5,464,060 | 11/1995 | Hale et al. | 133/293 |
| 5,472,051 | 12/1995 | Brothers | 166/293 |
| 5,555,937 | 9/1996 | Fisk, Jr. et al. | 166/301 |
| 5,585,333 | 12/1996 | Dahl et al. | 507/103 |
| 5,711,383 | 1/1998 | Terry et al. | 172/72 |
| 5,909,774 | 6/1999 | Griffith et al. | 166/312 |
| 5,988,279 | 11/1999 | Udarbe et al. | 166/293 |

*Primary Examiner*—David Bagnell
*Assistant Examiner*—Jennifer R. Dougherty
*Attorney, Agent, or Firm*—Craig W. Roddy; C. Clark Dougherty, Jr.

[57] ABSTRACT

Improved settable spotting fluid compositions and methods are provided. The settable spotting fluid compositions are basically comprised of a hydraulic settable component comprised of fly ash, a fluid loss control additive, a gel strength inhibiting additive, a set retarding additive and water selected from the group of fresh water and salt water present in an amount sufficient to form a slurry having a density in the range of from about 12 to about 15 pounds per gallon.

15 Claims, No Drawings

SETTABLE SPOTTING FLUID COMPOSITIONS AND METHODS

BACKGROUND OF THE INVENTION

1. Field of the Invention

This invention relates to settable spotting fluid compositions and methods of using the compositions in cementing wells.

2. Description of the Prior Art

Hydraulic cement compositions are commonly utilized in the construction of oil and gas wells. For example, hydraulic cement compositions are used in primary cementing operations whereby strings of pipe such as casings and liners are cemented in well bores. In performing primary cementing, a hydraulic cement composition is pumped into the annular space between the walls of a well bore and the exterior surfaces of a pipe string disposed therein. The cement composition is permitted to set in the annular space thereby forming an annular sheath of hardened substantially impermeable cement therein. The cement sheath physically supports and positions the pipe string in the well bore and bonds the exterior surfaces of the pipe string to the walls of the well bore whereby the undesirable migration of fluids between zones or formations penetrated by the well bore is prevented.

A variety of drilling fluids are used in drilling wells. The most commonly used drilling fluids are solids containing water base gels which can be weighted with particulate weighting material such as barite. During the drilling of a well bore, the drilling fluid used is circulated through the drill pipe and drill bit and then upwardly through the well bore to the surface. The drilling fluid functions to lubricate the drill bit and carry cuttings to the surface where the cuttings and gas are removed from the drilling fluid. While drilling fluids are not settable, i.e., they do not set into hard impermeable sealing masses when static, drilling fluids increase in gel strength over time. Typically, after a well bore is drilled to total depth, the drill pipe and drill bit are withdrawn from the well bore and the drilling fluid is left in the well bore to provide hydrostatic pressure on permeable formations penetrated by the well bore thereby preventing the flow of formation fluids into the well bore.

The next operation in completing the well bore usually involves running a pipe string, e.g., casing, into the well bore. Depending upon the depth of the well bore and whether or not problems are encountered in running the pipe string therein, the drilling fluid may remain relatively static in the well bore for a time period up to 2 weeks. During that time, the stagnate drilling fluid progressively increases in gel strength whereby the portions of the drilling fluid in the well bore become increasingly difficult to displace.

After the pipe string has been run in the well bore, the next operation performed is usually primary cementing. That is, the pipe string disposed in the well bore is cemented by pumping a cement composition through the pipe string and into the annulus between the pipe string and the walls of the well bore whereby the drilling fluid in the annulus is displaced therefrom by the cement composition. While a variety of techniques have been developed for improving the displacement of the drilling fluid from the annulus, if the drilling fluid has developed gel strength due to remaining static in the well bore for a long period of time, the portions of the drilling fluid in the well bore are bypassed by the cement composition. Since the drilling fluid is not settable, i.e., it does not set into a rigid enough mass to resist entry and flow of formation fluids in the well bore, formation fluids enter and flow in the well bore which is highly undesirable.

Heretofore, settable spotting fluid compositions have been developed and used in wells for various purposes including the early displacement of drilling fluids from well bores. However, the prior settable spotting fluids have included blast furnace slag and other hydraulic components which slowly set at relatively low temperatures, i.e., temperatures less than about 90° F. Also, slag-containing settable spotting fluids are intolerant to cement composition contamination, i.e., if well cement mixes with such spotting fluids, the spotting fluids prematurely set. To prevent a slag-containing spotting fluid from prematurely setting, a very strong set retarder must be added to the spotting fluid and the spotting fluid must be separated from the cement composition by a spacer fluid. If intermixing between the cement composition and the set retarded spotting fluid occurs, the cement composition may be prevented from setting by the strong set retarder in the spotting fluid.

Thus, there are needs for improved settable spotting fluid compositions which can be utilized to avoid well cementing problems of the types described above at subterranean temperatures above 90° F.

SUMMARY OF THE INVENTION

By the present invention improved settable spotting fluid compositions and methods of using the compositions in well cementing at temperatures up to about 150° F. are provided which meet the above described needs and overcome the deficiencies of the prior art. The settable spotting fluid compositions of this invention are basically comprised of a hydraulic settable component selected from ASTM Class C or the equivalent fly ash or ASTM Class F or the equivalent fly ash together with a source of calcium, a fluid loss control additive, a gel strength inhibiting additive, a set retarding additive and water selected from the group of fresh water and salt water present in an amount sufficient to form a slurry having a density in the range of from about 12 to about 15 pounds per gallon. When the amount of water required in a settable spotting fluid composition of this invention to achieve a desired density produces free water in the composition, a free water control agent such as bentonite, amorphous silica or hydroxyethylcellulose can be included in the composition to convert the free water to a gel.

Because the settable spotting fluid compositions of this invention are tolerant to well cement contamination, excessive or very strong set retarders do not need to be included in the compositions. Further, when displacing a settable spotting fluid composition of this invention with a well cement composition, a spacer fluid between the spotting fluid composition and the well cement composition does not have to be utilized, and there is no need to utilize a spacer for improving the settable spotting fluid displacement since any bypassed settable spotting fluid will set with time.

The improved methods of this invention for cementing a pipe string such as casing in a well bore containing drilling fluid with a cement composition are basically comprised of the steps of preparing a settable spotting fluid composition of this invention, pumping the settable spotting fluid composition into the well bore to displace at least a portion of the drilling fluid from the well bore thereby preventing the drilling fluid from remaining in the well bore and progressively increasing in gel strength over time therein, running the pipe string to be cemented into the well bore whereby the pipe string and well bore are at least partially filled with the settable spotting fluid, pumping and displacing the cement composition through the pipe string and into the annulus between the pipe string and the walls of the well bore whereby the drilling fluid and the settable spotting fluid composition in the pipe string and in the annulus are displaced therefrom except for portions of the settable spotting fluid composition which may remain in fractures or other permeable zones in the well bore, and allowing the cementing composition in the annulus and any settable spotting fluid composition remaining in the fractures or other permeable zones to set into a hard impermeable mass therein.

It is, therefore, a general object of the present invention to provide improved settable spotting fluid compositions and methods of using the compositions in cementing wells.

Other and further objects, features and advantages of the present invention will be readily apparent to those skilled in the art upon a reading of the description of preferred embodiments which follows.

DESCRIPTION OF PREFERRED EMBODIMENTS

The improved settable spotting fluid compositions of this invention for use in cementing wells at temperatures up to about 150° F. are basically comprised of a hydraulic settable component selected from ASTM Class C or the equivalent fly ash or ASTM Class F or the equivalent fly ash together with a source of calcium, a fluid loss control additive for preventing the loss of water from the composition to permeable subterranean formations, a gel strength inhibiting additive for preventing the composition from gaining gel strength for an initial relatively long period of time, a set retarding additive for delaying the setting of the composition into a hard impermeable mass for a relatively long period of time and water selected from the group of fresh water and salt water present in an amount sufficient to form a slurry having a density in the range of from about 12 to about 15 pounds per gallon.

The term "settable spotting fluid composition(s)" is used herein to mean a fluid which over time will harden into an impermeable mass having sufficient compressive strength to prevent the undesirable entry into and the flow of formation fluids in the well bore, but which will not set for a desired relatively long period of time in the range of from about 2 days to about 2 weeks or more. During this time, a pipe string, e.g., casing, can be placed in the well bore and conventional cementing operations can be completed.

Fly ash is produced by the combustion of powdered coal with a forced draft. The fly ash which is carried by the flue gases is recovered, for example, by electrostatic precipitators. ASTM Class C or the equivalent fly ash contains both silica and lime and when mixed with water forms a cementitious mixture which sets into a hard impermeable mass, i.e., calcium silicate hydrate. Class F fly ash does not contain lime, and a source of calcium ion is required for it to form a cementitious composition with water. Generally, lime is mixed with Class F or the equivalent fly ash in an amount in the range of from about 0% to about 25% by weight of the fly ash. Of the two forms of fly ash which are commercially available, i.e., ASTM Class C or ASTM Class F, ASTM Class F together with lime is preferred for use in accordance with the present invention.

A variety of fluid loss control additives can be used in accordance with this invention which are well known to those skilled in the art. A preferred such fluid loss control additive is a graft polymer having a backbone selected from the group consisting of lignin, lignite and their salts and grafted groups of at least one of 2-acrylamido-2-methylpropanesulfonic acid, acrylonitrile or N,N-dimethylacrylamide or their salts. The above described fluid loss additives are disclosed in detail in U.S. Pat. No. 4,676,317 issued to Fry et al. on Jun. 30, 1987, which is incorporated herein by reference. Another preferred fluid loss control additive for use in accordance with the present invention is a random polymerization product of two or three different vinyl containing monomers including a vinyl amide morpholine derivative. Such a fluid loss control additive is disclosed in detail in U.S. Pat. No. 5,988,279 issued to Udarbe et al. on Nov. 23, 1999, which is incorporated herein by reference. Of the above described fluid loss control additives, a graft polymer having a backbone of lignite and grafted groups of 2-acrylamido-2-methylpropanesulfonic acid, acrylonitrile and N,N-dimethylacrylamide or their salts is most preferred. The fluid loss control additive utilized is included in an improved settable spotting fluid composition of this invention in the general amount of from about 0.1% to about 1% by weight of the hydraulic settable component in the settable spotting fluid composition, more preferably in an amount in the range of from about 0.4% to about 0.75%.

The gel strength inhibiting additives useful in accordance with this invention which also function to reduce fluid loss are preferably selected from copolymers and copolymer salts of N,N-dimethylacrylamide and 2-acrylamido-2-methylpropanesulfonic acid. These fluid loss additives are disclosed in detail in U.S. Pat. No. 4,555,269 issued to Rao et al. on Nov. 26, 1985, which is incorporated herein by reference. The gel strength inhibiting additive used is generally included in a settable spotting fluid composition of this invention in an amount in the range of from about 0.1% to about 1% by weight of the hydraulic settable component in the composition, more preferably in an amount in the range of from about 0.4% to about 0.75%.

The set retarding additive is preferably selected from the ammonium, alkali metal, alkaline earth metal or other metal salts of a sulfoalkylated lignin. Such set retarding additives are disclosed in detail in U.S. Pat. No. Re. 31,190 reissued to Detroit et al. on Mar. 29, 1983, which is incorporated herein by reference. The most preferred set retarding additive of this type is the calcium salt of a sulfomethylated lignin. The set retarding additive is included in a settable spotting fluid composition of this invention in an amount in the range of from about 0.1% to about 2% by weight of the hydraulic settable component in the composition.

As mentioned, the water utilized in the settable spotting fluid compositions of this invention can be fresh water or salt water depending upon the particular density of the composition required. The term "salt water" is used herein to mean unsaturated salt water or saturated salt water including brines and seawater. The water is included in the settable spotting fluid compositions in an amount sufficient to form a slurry having a density in the range of from about 12 to about 15 pounds per gallon.

In order to prevent the presence of free water in the settable spotting fluid compositions, a free water control additive selected from bentonite, amorphous silica and hydroxyethylcellulose can be included in the compositions. Of the foregoing free water control additives, bentonite is preferred. When used, the free water control additive is present in the compositions of this invention in an amount in the range of from about 1% to about 5% by weight of the hydraulic settable component in the compositions.

The most preferred settable spotting fluid composition of this invention is comprised of a hydraulic settable component comprising ASTM Class F or the equivalent fly ash; hydrated lime present in the composition in an amount of about 5% by weight of the hydraulic settable component in the composition; a fluid loss control additive comprising a graft polymer having a backbone of lignite and grafted groups of 2-acrylamido-2-methylpropanesulfonic acid, acrylonitrile and N,N-dimethylacrylamide or their salts present in the composition in an amount in the range of from about 0.4% to about 0.75% by weight of the hydraulic settable component in the composition; a gel strength inhibiting additive comprising a copolymer of N,N-dimethylacrylamide and 2-acrylamido-2-methylpropanesulfonic acid present in the composition in an amount in the range of from about 0.4% to about 0.75% by weight of the hydraulic settable component in the composition; a set retarding additive comprising the calcium salt of a sulfomethylated lignin present in the composition in an amount in the range of from about 0.1% to about 2% by weight of the hydraulic settable component in the composition; and water selected from the group consisting of fresh water and salt water present in an amount sufficient to form a slurry having a density in the range of from about 12 to about 15 pounds per gallon.

The above composition can also include a free water control additive comprised of bentonite present in the composition in an amount in the range of from about 2% to about 5% by weight of the hydraulic settable component in the composition.

In accordance with the methods of the present invention, when a well bore is drilled to total depth and before the drilling fluid in the well bore has had a chance to gain significant gel strength, the drilling fluid is at least partially displaced with an improved settable spotting fluid composition of this invention. The drilling fluid is usually displaced by the settable spotting fluid composition to a level above those portions of the well bore containing fractures, vugs and other permeable areas or zones. The spotting fluid composition does not increase in gel strength with time like the drilling fluid, and it is easily displaced after being static in the well bore for a long period of time, e.g., a time period up to about two weeks. Because the drilling fluid has not had a chance to increase in gel strength and because the drill pipe includes large diameter drill collars and the like which cause high annular velocity, displacement of the drilling fluid is achieved by the settable spotting fluid composition of this invention.

After the well bore is at least partially filled with the spotting fluid composition, the pipe string to be cemented is run in the well bore. Depending on how much of the drilling fluid has previously been displaced, and if the pipe string is not floated into the well bore while being filled with the spotting fluid composition, some drilling fluid will remain in the pipe string. When the well cement composition is pumped through the pipe string into the annulus, the drilling fluid and spotting fluid composition in the pipe string and annulus are displaced ahead of the well cement composition. Because the annulus contains the spotting fluid composition, any drilling fluid entering the annulus will not have time to increase in gel strength therein and will be readily displaced therefrom by the well cement composition. The settable spotting fluid composition, if any, remaining in fractures or other permeable areas or zones in the well bore will ultimately set thereby preventing the entry or flow of formation fluids in the annulus.

Thus, the improved methods of this invention for cementing a pipe string in a well bore containing drilling fluid with a well cement composition are basically comprised of the following steps: (a) preparing a settable spotting fluid composition of this invention; (b) pumping the settable spotting fluid composition into the well bore to displace at least a portion of the drilling fluid out of the well bore thereby preventing the drilling fluid from remaining in fractures or other permeable zones in the well bore and progressively increasing in gel strength over time therein; (c) running the pipe string to be cemented into the well bore whereby the pipe string and well bore are at least partially filled with the settable spotting fluid; (d) pumping and displacing the well cement composition through the pipe string and into the annulus between the pipe string and the walls of the well bore whereby the drilling fluid and the settable spotting fluid composition in the pipe string and the annulus are displaced therefrom except for portions of the settable spotting fluid composition which may remain in fractures or other permeable zones therein; and (e) allowing the well cement composition in the annulus and any settable spotting fluid composition remaining in the fractures or other permeable zones therein to set into hard impermeable masses therein.

In order to further illustrate the compositions and methods of the present invention, the following example is given.

EXAMPLE

A base settable spotting fluid without additives was prepared comprised of 74 pounds of ASTM Class F fly ash, 3.7 pounds of lime (5% by weight of the fly ash) and 4.59 gallons of synthetic seawater. The resulting slurry had a density of 13.8 pounds per gallon. A fluid loss control additive, a gel strength inhibiting additive and a set retarding additive were added to first and second test portions of the base slurry in different amounts. A free water control agent was also added to the first portion. The rheologies of the first and second test portions were determined utilizing a Fann viscometer in accordance with the standard testing procedures set forth in *API Specification For Material And Testing For Well Cements*, API RP 10B, 21$^{st}$ Edition dated Sep. 1, 1991, of the American Petroleum Institute, Washington, D.C. The test settable spotting fluid compositions and the test results are set forth in Table I below.

TABLE I

Settable Spotting Fluid Compositions And Rheologies

| | Quantities of Additives in Base Composition | | | | | | | | | |
|---|---|---|---|---|---|---|---|---|---|---|
| Composition No. | Fluid Loss Control Additive[1], % by wt. of Fly Ash | Gel Strength Inhibiting Additive[2], % by wt. of Fly Ash | Set Retarding Additive[3], % by wt. of Fly Ash | Free Water Control Additive[4], % by wt. of Fly Ash | Fann Viscometer Readings, Bc | | | | | |
| | | | | | 100 rpm | 200 rpm | 300 rpm | 200 rpm | 100 rpm | 6 rpm | 3 rpm |
| 1 | 1.0 | 0.42 | 0.6 | 5 | 20 | 34 | 48 | 34 | 20 | 8 | 7 |
| 2 | 0.5 | 0.5 | 0.6 | — | 36 | 61 | 84 | 60 | 36 | 10 | 8 |

[1]A graft copolymer having a backbone of lignite and grafted groups of 2-acrylamido-2-methylpropanesulfonic acid, acrylonitrile and N,N-dimethylacrylamide
[2]Copolymer salt of N,N-dimethylacrylamide and 2-acrylamido-2-methylpropanesulfonic acid
[3]Calcium salt of a sulfomethylated lignin
[4]Bentonite From Table I, it can be seen that the settable spotting fluid compositions tested had good rheologies for functioning as displacement fluids.

The settable spotting fluid compositions given in Table I were tested for gel strength at 80° F. over time, fluid loss at 80° F. and set time at 150° F. The results of these tests are set forth in Table II below.

TABLE II

| | Quantities of Additives in Base Composition | | | | | | | | |
|---|---|---|---|---|---|---|---|---|---|
| Composition No. | Fluid Loss Control Additive[1], % by wt. of Fly Ash | Gel Strength Inhibiting Additive[2], % by wt. of Fly Ash | Set Retarding Additive[3], % by wt. of Fly Ash | Free Water Control Additive[4], % by wt. of Fly Ash | Gel Strength @ 80° F. | | | Fluid Loss @ 80° F., cc | Set Time @ 150° F., days |
| | | | | | 0 sec. | 10 min. | 30 min. | | |
| 1 | 1.0 | 0.42 | 0.6 | 5 | 7 | 9 | 8 | 7.4 | 11 |
| 2 | 0.5 | 0.5 | 0.6 | — | 8 | 9 | 10 | 7 | 11 |

[1]A graft copolymer having a backbone of lignite and grafted groups of 2-acrylamido-2-methylpropanesulfonic acid, acrylonitrile and N,N-dimethylacrylamide
[2]Copolymer salt of N,N-dimethylacrylamide and 2-acrylamido-2-methylpropanesulfonic acid
[3]Calcium salt of a sulfomethylated lignin
[4]Bentonite From Table II it can be seen that the gel strengths of the test settable spotting fluid compositions remained stable, the compositions had low fluid loss and the compositions did not set for 11 days.

Thus, the present invention is well adapted to attain the objects and advantages mentioned as well as those which are inherent therein. While numerous changes may be made by those skilled in the art, such changes are encompassed within the spirit of this invention as defined by the appended claims.

What is claimed is:

1. An improved settable spotting fluid composition for use in cementing wells comprising:
    a hydraulic settable component selected from the group consisting of ASTM Class C or the equivalent fly ash and ASTM Class F or the equivalent fly ash together with a source of calcium;
    a fluid loss control additive;
    a gel strength inhibiting additive;
    a set retarding additive comprised of the calcium salt of a sulfomethylated lignin present in said composition in an amount in the range of from about 0.1% to about 2% by weight of said hydraulic settable component in said composition; and
    water selected from the group of fresh water and salt water present in an amount sufficient to form a slurry having a density in the range of from about 12 to about 15 pounds per gallon.

2. The composition of claim 1 which further comprises a free water control additive selected from the group consisting of bentonite, amorphous silica and hydroxyethylcellulose.

3. The composition of claim 2 wherein said free water control additive is bentonite present in said composition in an amount in the range of from about 1% to about 5% by weight of said hydraulic settable component in said composition.

4. An improved settable spotting fluid composition for use in cementing wells comprising:
    a hydraulic settable component comprising ASTM Class F fly ash;
    hydrated lime present in said composition in an amount of about 5% by weight of said hydraulic settable component in said composition;
    a fluid loss control additive comprising a graft polymer having a backbone of lignite and grafted groups of 2-acrylamido-2-methylpropanesulfonic acid, acrylonitrile and N,N-dimethylacrylamide or their salts present in said composition in an amount in the range of from about 0.4% to about 0.75% by weight of said hydraulic settable component in said composition;
    a gel strength inhibiting additive comprising a copolymer of N,N-dimethylacrylamide and 2-acrylamido-2-methylpropanesulfonic acid present in said composition in an amount in the range of from about 0.4% to about 0.75% by weight of said hydraulic settable component in said composition;
    a set retarding additive comprising the calcium salt of a sulfomethylated lignin present in said composition in an amount in the range of from about 0.1% to about 2% by weight of said hydraulic settable component in said composition; and
    water selected from the group consisting of fresh water and salt water present in an amount sufficient to form a slurry having a density in the range of from about 12 to about 15 pounds per gallon.

5. The composition of claim 4 which further comprises a free water control additive comprised of bentonite present in said composition in an amount in the range of from about 2% to about 5% by weight of said hydraulic settable component in said composition.

6. An improved method of cementing a pipe string in a well bore containing drilling fluid with a cement composition comprising the steps of:
    (a) preparing a settable spotting fluid composition comprised of a hydraulic settable component selected from the group consisting of ASTM Class C or the equivalent fly ash and ASTM Class F or the equivalent fly ash together with a source of calcium, a fluid loss control additive, a gel strength inhibiting additive, a set retarding additive and water selected from the group of fresh water and salt water present in an amount sufficient to form a slurry having a density in the range of from about 12 to about 15 pounds per gallon;
    (b) pumping said settable spotting fluid composition into said well bore to displace at least a portion of said drilling fluid out of said well bore thereby preventing said drilling fluid from remaining in fractures or other permeable zones in said well bore and progressively increasing in gel strength over time therein;

(c) running said pipe string to be cemented into said well bore whereby said pipe string and well bore are at least partially filled with said settable spotting fluid;

(d) pumping and displacing said cement composition through said pipe string and into the annulus between said pipe string and the walls of said well bore whereby said drilling fluid and said settable spotting fluid composition in said pipe string and said annulus are displaced therefrom except for portions of said settable spotting fluid composition which may remain in fractures or other permeable zones therein; and (e) allowing said cement composition in said annulus and any settable spotting fluid composition remaining in said fractures or other permeable zones therein to set into hard impermeable masses therein.

7. The method of claim 6 wherein said hydraulic settable component in said settable spotting fluid composition is ASTM Class F or the equivalent fly ash together with a source of calcium.

8. The method of claim 7 wherein said source of calcium in said settable spotting fluid composition is lime.

9. The method of claim 6 wherein said fluid loss control additive in said settable spotting fluid composition is selected from the group consisting of a graft polymer having a backbone selected from the group consisting of lignin, lignite and their salts and at least one grafted group of 2-acrylamido-2-methylpropanesulfonic acid, acrylonitrile and N,N-dimethylacrylamide or their salts and a random polymerization product of two or three different vinyl containing monomers including a vinylamide morpholine derivative.

10. The method of claim 6 wherein said fluid loss control additive in said settable spotting fluid composition is a graft polymer having a backbone of lignite and grafted groups of 2-acrylamido-2-methylpropanesulfonic acid, acrylonitrile and N,N-dimethylacrylamide or their salts and is present in said composition in an amount in the range of from about 0.1% to about 1% by weight of said hydraulic settable component in said composition.

11. The method of claim 6 wherein said gel strength inhibiting additive in said settable spotting fluid composition is selected from the group consisting of copolymers and copolymer salts of N,N-dimethylacrylamide and 2-acrylamido-2-methylpropanesulfonic acid and is present in said composition in an amount in the range of from about 0.1% to about 1% by weight of said hydraulic settable component in said composition.

12. The method of claim 6 wherein said set retarding additive in said settable spotting fluid composition is selected from the group consisting of the ammonium, alkali metal, alkaline earth metal and other metal salts of a sulfoalkylated lignin.

13. The method of claim 6 wherein said set retarding additive in said settable spotting fluid composition is the calcium salt of a sulfomethylated lignin and is present in said composition in an amount in the range of from about 0.1% to about 2% by weight of said hydraulic settable component in said composition.

14. The method of claim 6 wherein said composition further comprises a free water control additive selected from the group consisting of bentonite, amorphous silica and hydroxyethyl cellulose.

15. The method of claim 14 wherein said free water control additive is bentonite present in said composition in an amount in the range of from about 1% to about 5% by weight of said hydraulic settable component in said composition.

* * * * *